Oct. 22, 1946.　　　　　F. P. SILHAN　　　　　2,409,714
SEAT
Filed Aug. 17, 1944
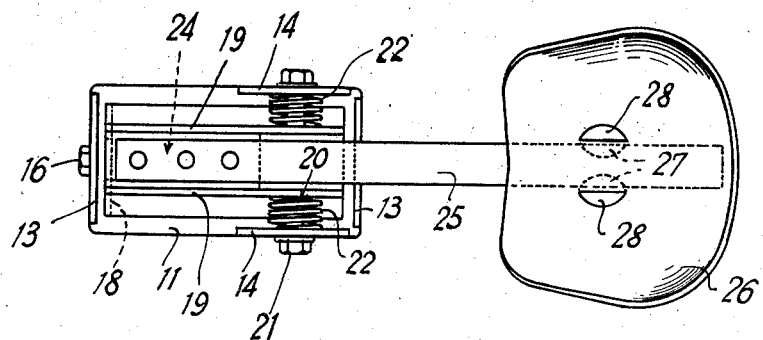
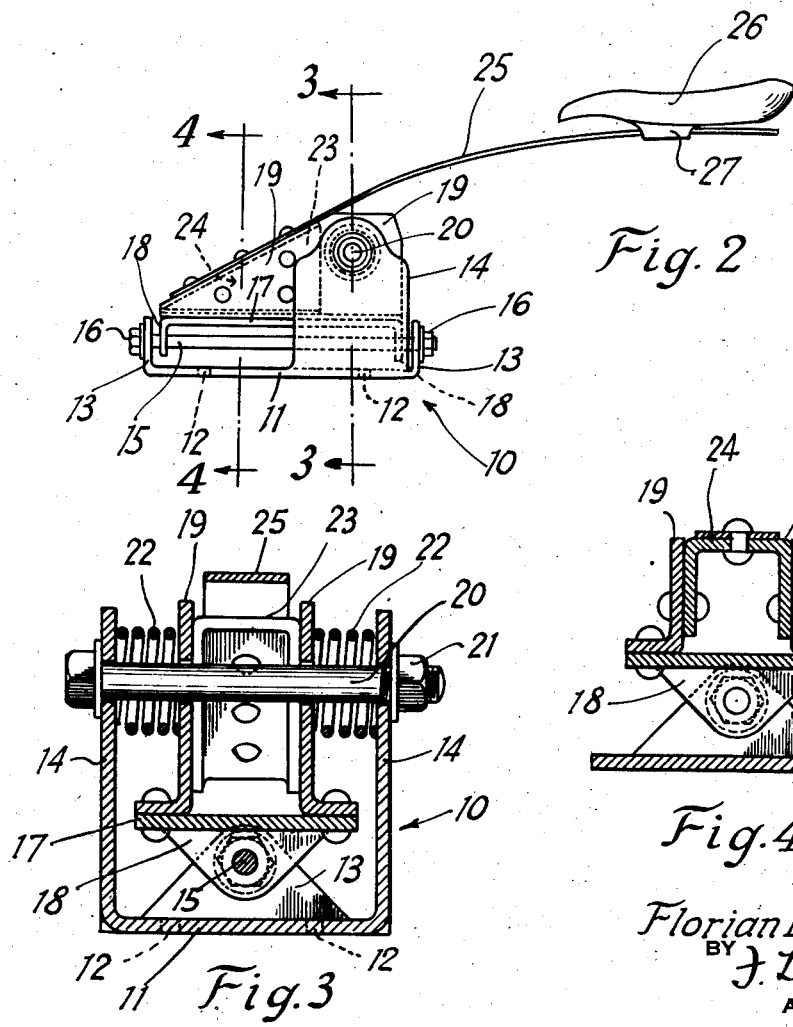
INVENTOR
Florian P. Silhan
BY J. Ledermann
ATTORNEY Patented Oct. 22, 1946

2,409,714

UNITED STATES PATENT OFFICE 2,409,714

SEAT

Florian P. Silhan, Marion, Kans.

Application August 17, 1944, Serial No. 549,829

1 Claim. (Cl. 155—121)

This invention relates to tractor seats, although it may with equal utility be applied to other vehicles as well as anywhere a seat may be desired, and aims to provide a seat of novel and practical construction which provides a cushioned yieldability not only in a vertical plane but also in a horizontal plane and in all planes in the upper quadrants between those planes.

A further object of the invention is the provision of a seat as stated above with means whereby it may be readily mounted or attached to any support, particularly a tractor, and which may be simply and inexpensively manufactured.

The above and other objects will become apparent in the description below, wherein characters of reference refer to like-numbered parts in the accompanying drawing. It is to be noted that the drawing is intended to serve the purpose of illustration only, and it is neither desired nor intended to limit the invention necessarily to the specific details of construction shown excepting insofar as they may be deemed essential to the invention.

Referring briefly to the drawing,

Fig. 1 is a plan view of the seat unit.

Fig. 2 is a side elevational view of the same.

Fig. 3 is a cross-sectional view taken on the line 3—3 of Fig. 2.

Fig. 4 is a cross-sectional view taken on the line 4—4 of Fig. 2.

Referring in detail to the drawing, the numeral 10 indicates the frame of the seat and constitutes a base 11 provided with openings 12 through which bolts or the like, not shown, are adapted to be passed to secure the frame to a support, not shown. The base 11 is somewhat elongated and has at the ends thereof a pair of upturned tongues 13. Near the rear end of the base 11, a pair of upturned ears 14 extend from the edges of the base.

A pin or shaft 15 is supported in the tongues 13 and removably retained therein by nuts or the like 16. A yoke 17 has its downwardly extending arms 18 provided with openings through which the pin 15 loosely extends, whence the yoke 17 may be said to be mounted on the pin 15 in the fashion of a rocker. A pair of substantially triangularly shaped wall members 19 are secured to and extend upward from the lateral edges of the yoke 17. A bolt 20 is supported in the opposed ears 14 and retained by a nut 21, thus being positioned above and at right angles to the pin 15, and it passes loosely through the walls 19. On each side of the frame, between a wall 19 and the adjacent ear 14, a coiled spring 22 surrounds the bolt 20.

Bolted, riveted, or otherwise secured to the walls 19 between the latter, is a frame member or support 23 having the form of substantially an inverted U in cross-section and being substantially triangular in side view so that the sloping upper wall or surface 24 of the member 23 lies in substantially the same plane as the upper edges of the triangular walls 19. The lower end of an elongated strip of stout yet flexible material, such as steel, is riveted or otherwise secured to the sloping surface 24 of the member 23 and extends rearward therefrom; the strip 25 has a seat 26 secured thereon at or near the rear end thereof.

The seat 26 illustrated is moreover slidably secured on the strip 25 so that its longitudinal position may be varied to accommodate the desires of the user and to vary its yieldability in a vertical plane. The seat is provided with depending flaps 27 which are cut out thereof, thus leaving openings 28 through the seat, and these flaps are bent around the underside of the strip to secure the seat on the strip and yet permit the seat to be slid longitudinally. Thus the seat is frictionally positioned on the strip. The seat shown is formed out of a sheet of material, such as, for instance, iron or steel, and it may also be provided with a cushion or a covering of other material, not shown.

It is apparent that, in addition to the vertical yieldability provided by the flexible seat supporting strip 25, cushioned lateral yieldability is provided by the rocker yoke 17. As the tractor on which the seat unit is mounted, sways or swings in a vertical plane at right angles to the direction of its travel, the support 23 and its attached members or parts will rock about the pin 15 against the cushioned resistance of the springs 22. Thus the driver will at all times be largely relieved of the shocks suffered by the moving vehicle and the consequent back ache, whence he is enabled to put in more hours of work on the tractor and yet return home less tired.

Obviously, modifications in form and structure may be made without departing from the spirit and scope of the invention.

I claim:

A seat comprising a base having upturned tongues at the front and rear ends thereof, a pin supported in said tongues, said base having upturned ears on the lateral edges thereof, a rocker mounted on and extending upward from said pin, a frame member mounted on said rocker and having its upper wall sloping upward in a rearward direction, an elongated strip having one end secured to said upper wall and extending rearward and having a seat mounted thereon distant from said upper wall, resilient means mounted between said rocker and said ears, a bolt supported in said ears and passing loosely through said rocker, said resilient means comprising coiled springs surrounding said bolt.

FLORIAN P. SILHAN.